United States Patent [19]

Takata et al.

[11] Patent Number: 5,127,435
[45] Date of Patent: Jul. 7, 1992

[54] FLUID PRESSURE CONTROLLER

[75] Inventors: Koji Takata; Koichi Hashida, both of Itami, Japan

[73] Assignee: Sumitomo Electric Industries, Ltd., Osaka, Japan

[21] Appl. No.: 653,227

[22] Filed: Feb. 8, 1991

[30] Foreign Application Priority Data

Feb. 9, 1990 [JP] Japan ................................. 2-29828

[51] Int. Cl.$^5$ ............................................ F15B 13/044
[52] U.S. Cl. ............................ 137/596.17; 137/625.65; 303/119 SV
[58] Field of Search ...................... 137/596.17, 625.65; 303/119 SV

[56] References Cited

U.S. PATENT DOCUMENTS 5,018,797  5/1991  Takata .......................... 303/119 X

FOREIGN PATENT DOCUMENTS 211409  9/1988  Japan ............................ 137/625.65
3-90462  4/1991  Japan .

*Primary Examiner*—Gerald A. Michalsky
*Attorney, Agent, or Firm*—Wenderoth, Lind & Ponack

[57] ABSTRACT

A fluid pressure controller having a housing having a first port and a second port, and a spool axially slidably mounted in the housing. First and second chambers are defined between opposing ends of the spool between the spool and the housing. The controller further has an electricity/power converter for applying to the spool an axial driving force corresponding to the magnitude of an electric command, and a spring for holding the spool in its initial position when the value of the electric command to the converter is zero. A variable-size orifice is provided to separately control communications between the first chamber and the first port depending upon the axial position of the spool. The second chamber normally communicates with the second port. A fixed-size orifice and a relief valve are provided parallel to each other in passages connecting the first and second chambers.

10 Claims, 1 Drawing Sheet

FLUID PRESSURE CONTROLLER

BACKGROUND OF THE INVENTION

This invention relates to a fluid pressure controller especially suitable for use in a brake device for an automobile, amoung various fluid pressure systems. More specifically, this invention relates to a controller which can bypass the flow when a large flow is required and which can control the rate of increase of pressure increase or decrease ( or, in a strict sense the rate of increase or decrease of flow velocity) to a value corresponding to the magnitude of an electric command in a small-flow region.

The present applicant has proposed in Japanese Patent Application 1-272628 a variable-flow fluid pressure controller in which a pressure differential corresponding to the magnitude of an electric command is generated between first and second chambers formed at opposing ends of a spool through a variable-size orifice defined by a shoulder portion of the spool. A fixed-size orifice is formed in a passage which maintains both chambers in comunication with each other so as to control the flow rate according to the pressure differential. Further a bypass is formed which is adapted to be opened if the required flow rate is larger than a threshold value which is lower than the value which an electricity/power converter can attain by generating its maximum output.

FIG. 3 shows an example of a prior art device of this type which has a housing 111, a spool 112, an input port 113, a peripheral passage 114, a fixed-size orifice 115, an output port 116, a discharge port 117, a spring 110, a driver 119 and an electricity/power converter 120. It also has a bypass 123 for pressure increase and a bypass 124 for pressure reduction. The bypass 123 performs its function when its elements 123a, 123b and 123c communicate with one another whereas the bypass 124 does so when its elements 124a 124b communicate with each other.

With the device disclosed in the above-mentioned prior application, the bypasses are opened by an overstroke of the spool. Thus, an extre stroke is required for the electricity/power converter. But if the bypasses are formed in the spool itself, the length of the extra stroke has to be increased further to prevent the fluid leakage at the outer periphery of the spool.

SUMMARY OF THE INVENTION

An object of this invention is to provide a variable-flow fluid pressure controller having bypasses which obviates the abovesaid shortcomings and which requires no extra stroke of the electricity/power converter.

Accordingly to this invention, in a variable-flow control valve in which a pressure differential corresponding to the magnitude of an electric command is generated between the first and second chambers formed at opposing ends of the spool so as to control the flow rate, with the fixed-size orifice provided in a passage through which both chambers communicate with each other, a relief valve for bypass is provided in the passage in parallel with the passage having the fixed-size orifice. The relief valve is adapted to be opened when the required flow rate reaches its threshold value which is determined to be slightly lower than the value corresponding to the maximum output of thee electricity/power converter, by the differential pressure between the first and second chambers which corresponds to the required flow rate.

The structure which characterizes this invention can be applied to a one-way type controller for pressure increase only or for pressure reduction only, or for a two-way type controller for both pressure increase and pressure reduction. A two-way type controller may be provided with only one of the relief valves, for pressure increase or reduction.

By providing the relief valve in a bypass, no overstroke of the spool is necessary. Thus no extra stroke for ensuring liquid-tightness is necessary. This serves to shorten the stroke required of the electricity/power converter.

Further, in the arrangement wherein the bypasses are opened by use of the overstroke of the spool, a plurality of such bypasses have to be formed in the high-precision parts, i.e. the spool and the guide surface in the housing accommodating the spool. This will lead to an increase in the production cost. The relief valve will serve to obviate this shortcoming.

This type of variable-flow control valve has excellent properties in that hydraulic shock, which causes noise and vibrations, can be reduced to a negligible level, and in that a precise feedback control is possible since the hydraulic vibration is not reflected in the measurements of the output fluid pressure.

But the prior art structure having no bypass was used in a rather limited range of applications because of the greater required size of the electricity/power converter or the narrow flow control range. Even if a bypass is added to this structure, it is impossible to avoid an increase in the stroke of the electricity/power converter if the bypass has to be opened by the overstroke of the spool.

According to this invention, during the transition period where a large flow is required, any excess flow above the threshold determined by the capacity of the electricity/power converter is supplied through the bypass. In the small-flow region where a smooth control is required, the merit of the variable-flow control valve is fully realized. Thus the variable-flow control valve according to this invention is compact and inexpensive and can be used in a wider range of industrial fields where electronic fluid pressure control is necessary.

BRIEF DESCRIPTION OF THE DRAWINGS

Other features and objects of the present invention will become apparent from the following description taken with reference to the accompanying drawings, in which.

DETAILED DESCRIPTION OF THE INVENTION

Figure 1:
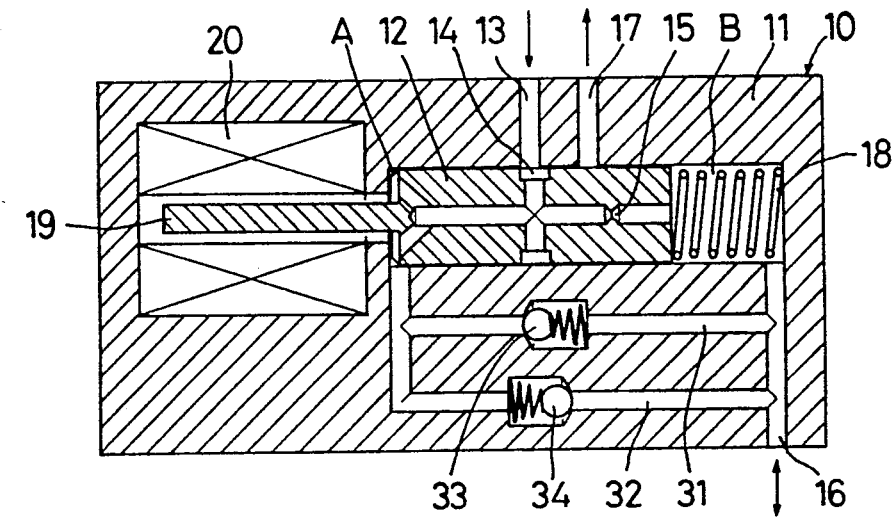
FIG. 1 is a schematic sectional view of one embodiment of this invention.
Figure 2:
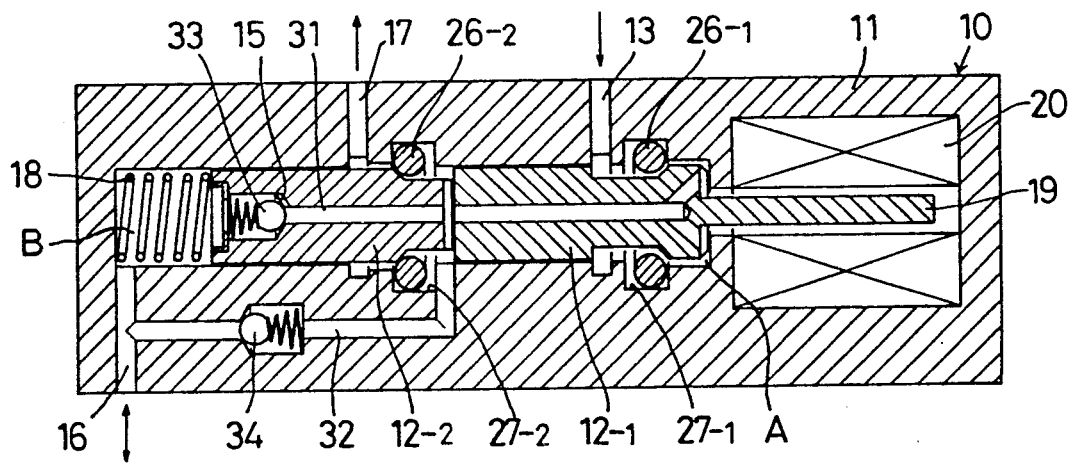
FIG. 2 is a schematic sectional view of another embodiment.
Figure 3:
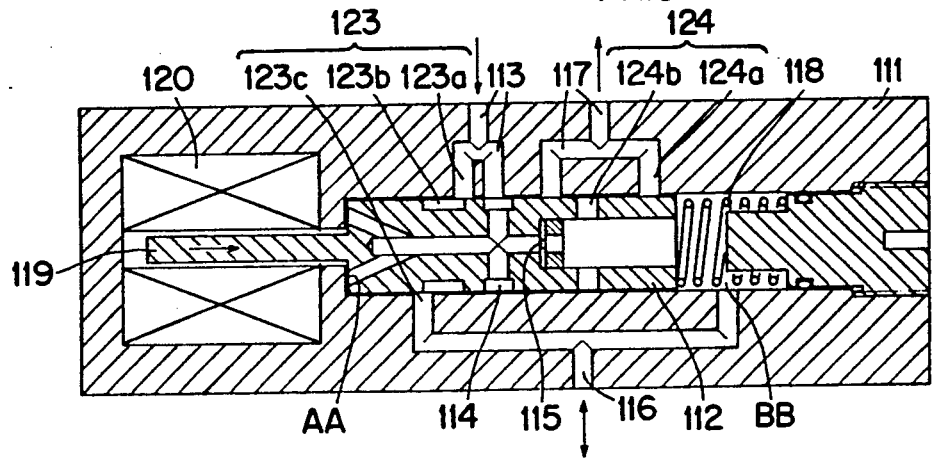
FIG. 3 is a sectional view of a prior art device.

The first and second embodiments shown in FIGS. 1 and 2, respectively have the same function as the prior art device which is shown in FIG. 3 for comparison purposes. Further, to facilitate understanding, they are shown schematically.

In FIG. 1, a fluid prssure controller 10 comprises a housing 11 having an input port 13, a discharge port 17 and an output port 16, and a spool 12 axially movably mounted in the housing 11.

A first chamber A is defined by one end of the spool 12 and the housing 11 whereas a second chamber B is defined by the other end of the spool and the housing so as to communicate with the output port 16. The spool 12 is formed with an internal passage for fluid communication between the chambers A and B through a fixed-size orifice 15, and a peripheral passage 14 communicatiing the outer peripheral surface of the spool with the internal passage at a point between the fixed-size orifice 15 and the chamber.

The controller is further pprovided with an electricity/power converter 20 for driving the spool 12, and a spring 18 for keeping the spool in an initial position when the output of the electricity/power converter is zero.

Further, passages 31 and 32 including relief valves 33 and 34, respectively, extend between the first and second chambers A and B in parallel with the internal passage which includes the fixed-size orifice 15. This is the main characterizing feature of the present invention. The passages 31 and the valve 33 are for pressure increase while the passage 32 and the valve 34 are for pressure reduction.

In this arrangement, the flow rate through the controller, i.e. the flow rate through the fixed-size orifice, is determined by the pressure differential acrons the fixed-size orifice 15, that is, the pressure differential between the chambers A and B. The pressure differential is, in turn, determined by the difference between the output of the electricity/power converter 20 and the force of the spring 18.

The spool 12 moves automatically so as to adjust the degree of opening of a variable-size orifice formed between the peripheral passage 14 and the input port 13 or between the former and the discharge port 17 to maintain the fluid pressure differential between the chambers A and B.

Thus, the controlled flow rate corresponds to the magnitude of the electric command given to the electricity/power converter. But since the electricity/power converter has a limited capacity, the differential pressure attainable with the converter, and thus the flow rate through the fixed-size orifice, are limited.

The relief valves 33 and 34 have a relief pressure preset to a slightly smaller value than the above-described maximum attainable pressure differential.

Thus, when the pressure differential corresponding to the required flow rate exceeds the predetermined relief pressure, one of the relief valves will open, thus allowing the fluid to flow from the input port to the output port or from the output port to the discharge port through the passage 31 or 32 to bypass the fixed-size orifice 15. Thus the fluid pressure at the output side can be increased or decreased quickly. While the bypass 31 or 32 is open, the flow control function of the fixed-size orifice is lost. But this function will be recovered as soon as the pressure differential drops to below the relief pressure.

Thus, there is no difference in function between the controller according to the present invention and the prior art controller. But as is readily apparent by comparing FIG. 1 with FIG. 3, in this embodiment, expensive additional machining on the spool and its mating surface is eliminated by providing the inexpensive relief valves. Further, the stroke required of the electricity/power converter is considerably shortened.

In order to further reduce the size of the entire device, it is desirable to form the relief valves inside the spool. In this case, at least part of one of the bypasses is coextensive with the internal passage.

The fixed-size orifice 15 may be provided in parallel with the relief valves or, as shown in FIG. 2, it may be formed by purposely imperfectly sealing the seat of one of the relief valves (e.g. by forming a cutout in the seat).

It is possible to provide either the relief valve for pressure increase or that for pressure reduction in the spool. But it would be impossible from a manufacturing viewpoint to provide both relief valves in the spool because they have to be provided in parallel to each other. Thus, one of the relief valves will have to be provided outside the spool. Since one of the passages having a relief valve has to be provided outside the spool, it may be advantageous to provide the fixed-size orifice and the internal passage including it outside the spool, too. This is especially true in case the spool diameter is reduced to reduce the size of the electricity/power converter. These variations are possible because functionally the fixed-size orifice and the passages having valves are only required to extend parallel with each other to communicate between the chambers A and B.

FIG. 2 shows the second embodiment in which the spool is made up of two spool portions 12-1 and 12-2, and in which ring valve members 26-1 and 26-2 are mounted on the spool portions 12-1 and 12-2, respectively, to form variable-size orifices between the ring valve members and shoulders of the spool portions. In this embodiment, one of the bypasses having a relief valve is provided outside the sleeve and the other relief valve is provided in one of the spool portions.

According to this invention, the initial position of the spool when the electricity/power converter 20 is not activated can be preset to any of the position for pressure increase, the position for pressure hold (both closed) and the position for pressure reduction by changing the arrangement of the spring 18 and the characteristics of the electricity/power converter 20.

For example, in both the emobodiments shown in FIGS. 1 and 2, the initial position of the spool when the electricity/power converter is not activated is the position for pressure increase. But by setting the position of the spool when not activated so that the peripheral passage 14 communicates with the discharge port 17, the initial position can be set at the position for pressure reduction. Also, if the spool position when the electricity/power converter not activated is set so that the peripheral passage 14 communicates with neither the input port 13 nor the discharge port 17, the initial position will correspond to the position for pressure hold.

In the embodiments, the controllers are shown to have both the bypass for pressure increase and the bypass for pressure reduction. But if one of them is not necessarry, it may be omitted.

Also, both embodiments show controllers operable in both axial directions. But a one-way type controller for either pressure increase only or pressure reduction only is possible simply by removing either the port 13, relief valve 336 and associated parts, or instead, the port 17, relief valve 34 and associated parts. In the former case, the port 16 is for higher pressure and the port 17 is for lower pressure whereas in the latter case, the port 13 is for higher pressure and the port 16 for lower pressure.

Further, any other conventional design feature may be added. For example, any of the parts may be divided for easy assembly, a groove for fluid communication may be formed in the spool or a spring force adjusting means may be provided.

What is claimed is:

1. A fluid pressure controller comprising:

a housing having a first port and a second port;

a spool axially slidably mounted in said housing;

first and second chambers defined at opposing ends of said spool, respectively, between said spool and said housing;

an electricity/power converter means for imparting to said spool an axial driving force corresponding to the magnitude of an electric command;

a spring means for maintaining said spool in an initial position when no axial force is imparted to said spool by said electricity/power converter means;

a variable-size orifice means for controlling commmunication between said first chamber and said first port in dependence on the axial position of said spool;

a passage means for maintaining and second chamber in communication with said second port;

passages extending in parallel with one another and connecting said first and second chambers;

a fixed-size orifice provided in one of said passages;

a relief valve provided in one of said passages;

wherein when a pressure differential generated between said first and second chambers is smaller than a relief pressure of said relief valve, a flow rate between said first and second chambers is controlled by said fixed-size orifice so as to correspond to said pressure differential; and wherein when said presure differential exceeds said relief pressure of said relief valve, a bypass is formed between said first and second chambers through said relief valve, and a flow rate between said first and second chambers increases beyond said rate controlled by said fixed-size orifice.

2. A fluid pressure controller as claimed in claim 1, wherein said one of said passages which is provided with said fixed-size orifice comprises an internal passage formed through said spool.

3. A fluid pressure controller as claimed in claim 2, wherein a relief valve is provided in said internal passage together with said fixed-size orifice.

4. A fluid pressure controller as claimed in claim 3, wherein said relief valve has a valve seat having an imperfectly sealed portion which defines said fixed-size orifice.

5. A fluid pressure controller as claimed in claim 1, wherein said spool is provided with a shoulder;

a ring valve member is provided between said housing and said spool; and said variable-size orifice means is defined by said shoulder and said ring valve member.

6. A fluid pressure controller comprising:

a housing having an input port, a discharge port and an output port;

a spool axially slidably mounted in said housing;

first and second chambers defined at opposing ends of said spool, respectively, between said spool and said housing;

an electricity/power converter means for imparting to said spool an axial driving force corresponding to the magnitude a spring means for maintaining said spool in an initial position when no axial force is imparted to said spool by said electricity/power converter means;

a first variable-size orifice means for controlling communication between said first chamber and said discharge port in dependence on the axial position of said spool;

a second variable-size orifice means for controlling communication, separately from said first variable-size orifice means, between said first chamber and said input port in dependence on the axial position of said spool;

said first and second variable-size orifices being further operable to simultaneously prevent communication between said first chamber and said discharge port and between said first chamber and said input port;

a passage means for maintaining said second chamber in communication with said output port;

passages extending in parallel with one another and connecting said first and second chambers;

a fixed-size orifice provided in one of said passages;

at least one of a pressure increase relief valve and a pressure reduction relief valve provided in said passages;

wherein when a pressure differential generated between said first and second chambers is smaller than a relief pressure of said at least one of said pressure increase relief valve and said pressure reduction relief valve, a flow rate between said first and second chambers is controlled by said fixed-size orifice so as to correspond to said pressure differential; and wherein when said pressure differential exceeds said relief pressure of said at least one of said pressure increase relief valve and said pressure reduction relief valve, a bypass is formed between said first and second chambers through said at least one of said pressure increase relief valve and said pressure reduction relief valve, and a flow rate between said first and second chambers increases beyond said flow rate controlled by said fixed-size orifice.

7. A fluid pressure controller as claimed in claim 6, wherein said one of said passages which is provided with said fixed-size orifice comprises an internal passage formed through said spool.

8. A fluid pressure controller as claimed in claim 7, wherein one of said pressure increase relief valve and said pressure decrease relief valve is provided in said internal passage together with said fixed-size orifice.

9. A fluid pressure controller as claimed in claim 8, wherein one of said pressure increase relief valve and said pressure decrease relief valve has a valve seat having an imperfectly sealed portion which defines said fixed-size orifice.

10. A fluid pressure controller as claimed in claim 6, wherein said spool is provided with a shoulder;

a ring valve member is provided between said housing and said spool; and one of said first and second variable-size orifice means is defined by said shoulder and said ring valve member.

* * * * *